United States Patent
Green et al.

[15] 3,698,132
[45] Oct. 17, 1972

[54] VARIABLE DISPLACEMENT HOLDER

[72] Inventors: Lawrence E. Green, Stinson Beach; William G. McDermott, Sausalito, both of Calif.

[73] Assignee: McDermott & Green, Inc., San Francisco, Calif.

[22] Filed: Dec. 23, 1971

[21] Appl. No.: 211,436

[52] U.S. Cl. .................47/41.13, 220/69, 211/60, 150/11
[51] Int. Cl............................A01g 5/00, B65d 29/04
[58] Field of Search .....................131/241; 220/69; 47/41–41.13; 211/60; 161/27; 150/11; 206/46 AM

[56] References Cited

UNITED STATES PATENTS

| | | |
|---|---|---|
| 980,565 | 1/1911 | Sanborn ....................47/41.11 |
| 1,872,640 | 8/1932 | Pink....................206/46 AM |
| 2,219,974 | 10/1940 | Bellows.......................220/69 |
| 2,390,423 | 12/1945 | Carter..........................150/11 |
| 2,929,171 | 3/1960 | Josephson ................47/41.13 |
| 2,929,511 | 3/1960 | Josephson ....................211/60 |
| 2,982,051 | 5/1961 | Wheelock..................47/41.13 |
| 3,418,194 | 12/1968 | Loftice........................161/27 |

*Primary Examiner*—Robert E. Bagwill
*Attorney*—Stephen S. Townsend et al.

[57] ABSTRACT

A variable displacement holder and support for flower stems, pencils, hors d'oeuvre sticks, etc. formed with a plurality of marbles and a net enclosure formed with the mesh large enough to permit insertion of stems of various size through the net openings but small enough to contain the marbles. A net enclosure surrounds and loosely contains the marbles so that stems can be inserted through the net openings to displace the marbles which provide support under the restraint of the enclosure. In the preferred form, the net enclosure confines the marbles in a toroidal configuration.

5 Claims, 4 Drawing Figures

PATENTED OCT 17 1972 3,698,132
FIG_1
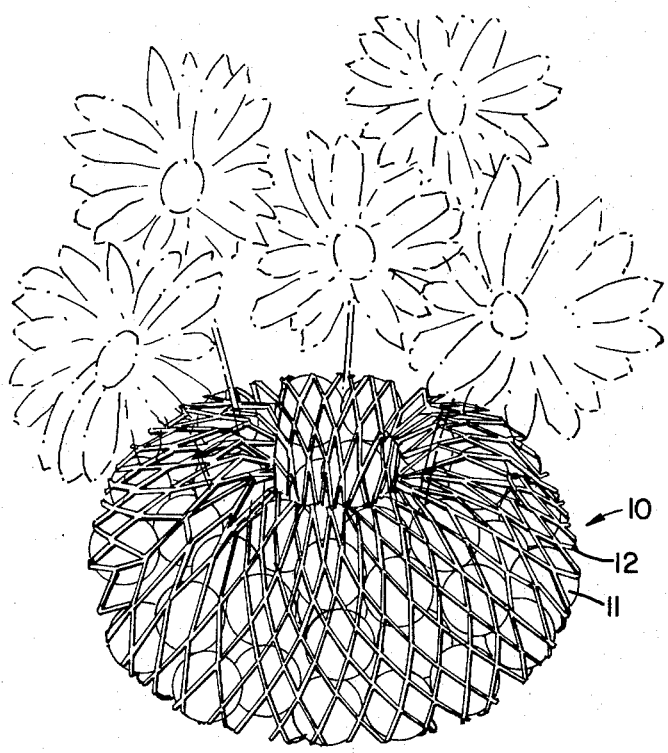
FIG_2
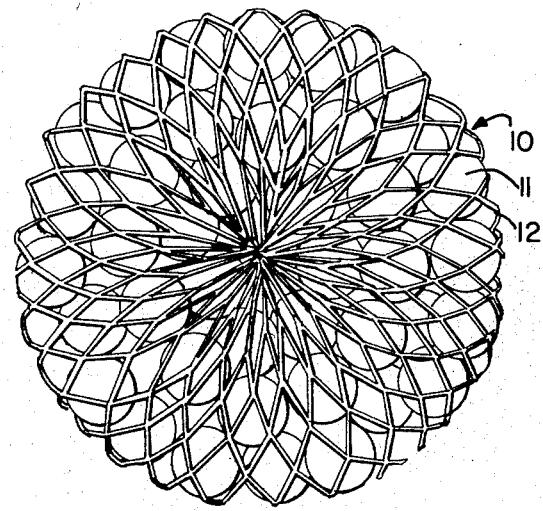
FIG_3
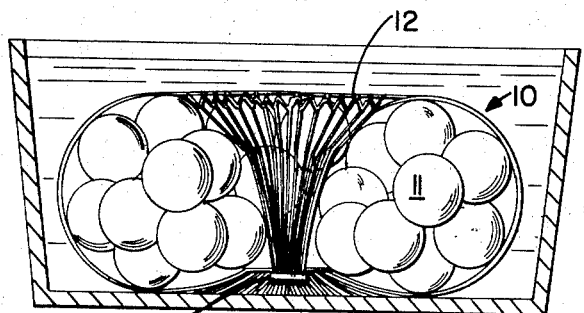
FIG_4
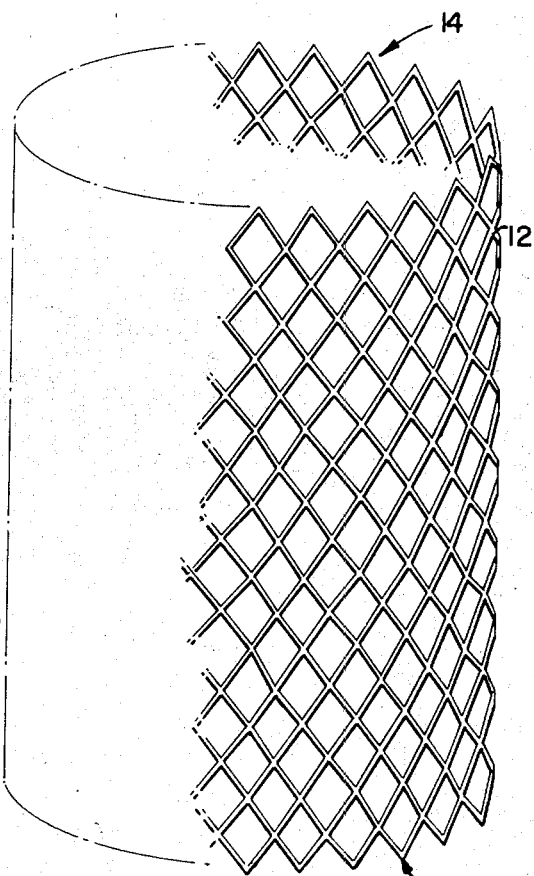

VARIABLE DISPLACEMENT HOLDER

This invention relates to a new variable displacement holder for supporting and holding flower stems, pencils, hors d'oeuvre sticks and similar objects.

It is an object of the present invention to provide an esthetic and versatile variable displacement holder useful in a variety of environments, for example, holding and supporting flowers in water, and holding or supporting pencils or hors d'oeuvre sticks without mutilating the stem as in conventional prong holders.

As used hereinafter and in the claims, the word stems is intended to generally include flower stems, pencils, pens, hors d'oeuvre sticks and similar objects.

The invention contemplates for structural holding and support of a variety of stems a plurality of marbles and a net enclosure formed with a mesh large enough to permit insertion of stems of various size through the net openings but small enough to contain the marbles. The net enclosure surrounds and loosely contains the marbles. A feature and advantage of this arrangement is that stems can be inserted through the net openings to displace the loosely contained marbles which support the stems under the tension and confinement of the net enclosure.

In a preferred embodiment, the net enclosure surrounds and loosely confines the marbles in a toroidal configuration. According to one construction, this configuration is achieved by utilizing a tubular or cylindrical shaped net enclosure. The bottom of the tubular-shaped net enclosure is drawn up around the marbles to join the top of the enclosure and the respective ends of the enclosure are clamped together forming a joint at the center bottom of the toroidal configuration so that the joint is not visible when the support is in its upright position.

A feature and advantage of the torus-shaped holder and support is that the marbles although loosely confined are maintained distributed substantially evenly around the holder and support so that bunching or grouping of the marbles is avoided.

The invention also contemplates a variety of other functional and esthetic features for the variable displacement holder. For example, the net enclosure may be formed of clear plastic with the marbles substantially transparent in color so that the holder and support is substantially invisible when immersed in water. On the other hand, a variety of colors can be used for the marbles for esthetic appearance.

Other features and advantages of the present invention will become apparent in the following specification and accompanying drawings.

FIG. 1 is a perspective view of a variable displacement holder in accordance with the present invention used as a flower holder and support;

FIG. 2 is a plan view and FIG. 3 is a side cross-sectional view of the variable displacement holder; and FIG. 4 is a side perspective view of a tubular or cylindrical net enclosure suitable for providing the toroidal configuration.

As shown in FIGS. 1 through 3, the variable displacement holder 10 is formed from a plurality of marbles 11 and a net enclosure 12. In this example, the net enclosure 12 loosely confines the marbles 11 in a toroidal configuration maintaining the marbles distributed around the holder or support.

In order to achieve the toroidal configuration, the net enclosure 12 is initially formed in the shape of a tube or cylinder as illustrated in FIG. 4. The tubular net enclosure can be formed by extrusion, as, for example, an extruded polypropylene net. The bottom 13 of the net 12 is then drawn up around the marbles to join the top 14 of the net and the edges are gathered together and clamped by means of a clamp 15 as shown in FIG. 3. The clamp or joint 15 is located at the center bottom of the final toroid configuration so that it is not visible when the torus holder is in the proper position as shown in FIGS. 1 and 2.

The net enclosure and marbles can be substantially transparent so that the variable displacement holder is invisible when immersed in water as shown in FIG. 3.

A feature and advantage of the variable displacement holder is that it has a variety of uses as a flower holder and supporter, pencil and pen supporter, hors d'oeuvre stick holder and is washable. For high-temperature washing, a more durable material must be used for the net enclosure such as, for example, nylon.

In using the variable displacement holder, stems of various types are inserted through the mesh openings of the net and between the marbles which are displaced by the inserted stem. At the same time, the marbles support the stem under the tension of the confining net without damage to the stems as would otherwise occur with conventional prong holders.

It is apparent that the displacement holder and support contemplated by the present invention can be constructed in a variety of arrangements and configurations other than the preferred example described herein.

We claim:

1. A variable displacement holder and support comprising:
    a plurality of marbles and a net enclosure formed with a mesh large enough to permit insertion of stems of various size through the net openings but small enough to contain the marbles, said net enclosure surrounding and loosely containing said marbles so that stems can be inserted through the net openings displacing the loosely contained marbles which support the stems as a result of the confinement by the net enclosure, said net enclosure formed to enclose the marbles in a toroidal configuration, said net enclosure and marbles being substantially transparent whereby the holder and support is substantially invisible when immersed in water.

2. A holder and support as set forth in claim 1 wherein the net enclosure is formed in a tubular configuration and wherein one end of the tube is pulled up inside the tubular configuration and joined with the other end of the tube to form a torus enclosure for the marbles.

3. A displacement holder and support comprising:
    a plurality of marbles;
    a tubular shaped net enclosure formed with a mesh large enough to permit passage of stems of various size through the net openings but small enough to contain the marbles, one end of said tubular shaped net enclosure being drawn up inside the tubular shape to join the other end of the tubular net enclosure for surrounding and loosely containing said marbles in a toroidal configuration;

and means gathering the ends of the net enclosure together and forming a joint between the ends of said tubular net enclosure at the center bottom of the resulting toroidal configuration for loosely containing said marbles whereby stems can be inserted through the net openings and between the loosely contained marbles for supporting said flower stems.

4. A holder and support as set forth in claim 3 wherein the net enclosure is formed of clear plastic and the marbles are substantially transparent in color whereby the holder and support is substantially invisible when immersed in water.

5. A holder and support as set forth in claim 3 wherein the net enclosure is formed of plastic and the marbles are of variable coloration.

* * * * *